Aug. 16, 1966 D. W. HANEY ETAL 3,266,796

DOCUMENT HANDLING APPARATUS

Filed Dec. 21, 1964 2 Sheets-Sheet 1

INVENTORS
DONALD W. HANEY
RICHARD H. HARRINGTON
BY K. P. Johnson
ATTORNEY

DOCUMENT HANDLING APPARATUS

Filed Dec. 21, 1964 2 Sheets-Sheet 2

United States Patent Office 3,266,796

Patented August 16, 1966

3,266,796

DOCUMENT HANDLING APPARATUS

Donald W. Haney and Richard H. Harrington, Vestal, N.Y., assignors to International Business Machines Corporation, Armonk, N.Y., a corporation of New York Filed Dec. 21, 1964, Ser. No. 420,058

15 Claims. (Cl. 271—45)

This invention relates generally to apparatus for handling record documents or sheets, and more particularly to apparatus for transporting and stacking sheets of randomly varying size.

As machines are used in more numerous applications in the field of data processing, they must be capable of handling an increasing range of document sizes. Machines are generally designed to operate asynchronously rather than on a fixed cycle basis in order to achieve optimum efficiency of machine time. Document transport apparatus must therefore be able to convey documents of various lengths to a stacker and yet deposit the documents in a neat orderly stack. When providing a stacker, however, an opening of sufficient size for the largest document is often too large for the smaller documents so that the machine loses control of the documents and they are deposited haphazardly in the stacking pocket.

A further difficulty arises because of the accompanying variation in document thickness which ranges from tabulating card material to tissue-thin invoice copies. Because of this, close control must be exercised over each document as it arrives at the stacking pocket. Thus the conventional stacking mechanisms often fail to grip a document when it is extremely thin or fail to accept the thicker documens. These mechanisms are usually preadjusted to a small range of sizes and are unreliable when the range is extended. It is therefore desirable that a stacking apparatus be provided which is capable of receiving a document at the entrance thereto irrespective of cycle time and carry the document positively into the stacking pocket, depositing the document accurately on the stack.

Accordingly, it is an object of this invention to provide an asynchronously operable stacking apparatus capable of reliably stacking documents to widely varying size.

Another object of this invention is to provide apparatus which conveys an incoming document to an aligning surface at the document stack.

Another object of this invention is to provide document stacking apparatus in which operation of the apparatus is initiated by an incoming document to be stacked.

Still another object of this invention is to provide stacking apparatus which is capable of handling documents having a wide range of thickness.

In accordance with the foregoing objects, the invention provides a continuously moving endless member to which document carrier means can be secured for movement with the member. The carrier means has a clamping element that is operable to an open or closed position to grip a document placed therein for the carrier means to convey the document to the stacking pocket. Cam means are movable into the path of the carrier means during travel to disengage the carrier means from the member and open the clamping means. The carrier means are held in disengagement until the cam means are moved away from the carrier means by control means actuated with the arrival of a leading edge of a document to be stacked. This action permits the clamping element to also grip the leading edge of the incoming document and so hold the document until it reaches the pocket where only the clamping element is moved to the open position to release the document.

This arrangement has an advantage in that a plurality of carrier means and plurality of cam means can be mounted at various locations about the periphery of the endless member so that the carrier means may be supplied at random as necessary for successive documents. Control of the carrier means is so available by the leading and trailing edges of the documents so that the document length in effect determines the availability of the carrier means for the next document.

The foregoing and other objects, features and advantages of the invention will be apparent from the following more particular description of a preferred embodiment of the invention, as illustrated in the accompanying drawings wherein.

Figure 1:
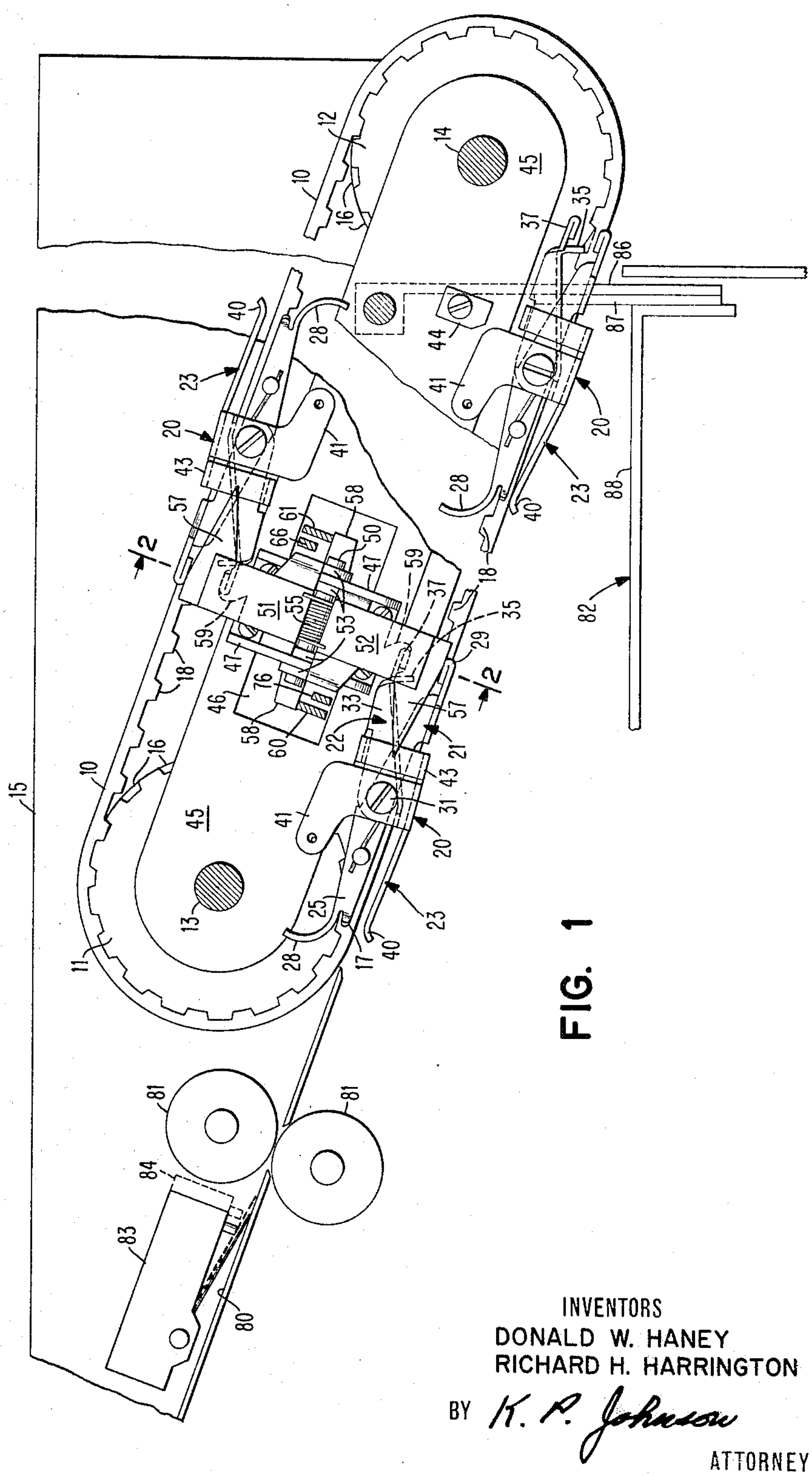
FIGURE 1 is a side elevation view of the document conveying apparatus of the invention shown in conjunction with transport rolls and a stacking pocket.

Referring to the drawings, a toothed, endless, flexible member 10, such as a timing belt, is supported for rotation on correspondingly toothed pulleys 11 and 12. Pulley 11 is an idler pulley freely rotatable on shaft 13 and pulley 12 is a driving pulley secured to shaft 14 which is, in turn, driven counterclockwise by any suitable source of power. Shaft 13 is fixed in plate 15 and shaft 14 is journaled therein to be freely rotatable. The pulleys are each narrower than the belt so that the belt extends beyond the pulley edges permitting document carrier clips to be secured to the belt during rotation about the pulleys. The belts are held in alignment on the pulleys by providing flanges 16 of inverted V-shape about the center of each pulley periphery which mate with corresponding V-cuts 17 in the belt teeth 18.

Figures 2, 3:
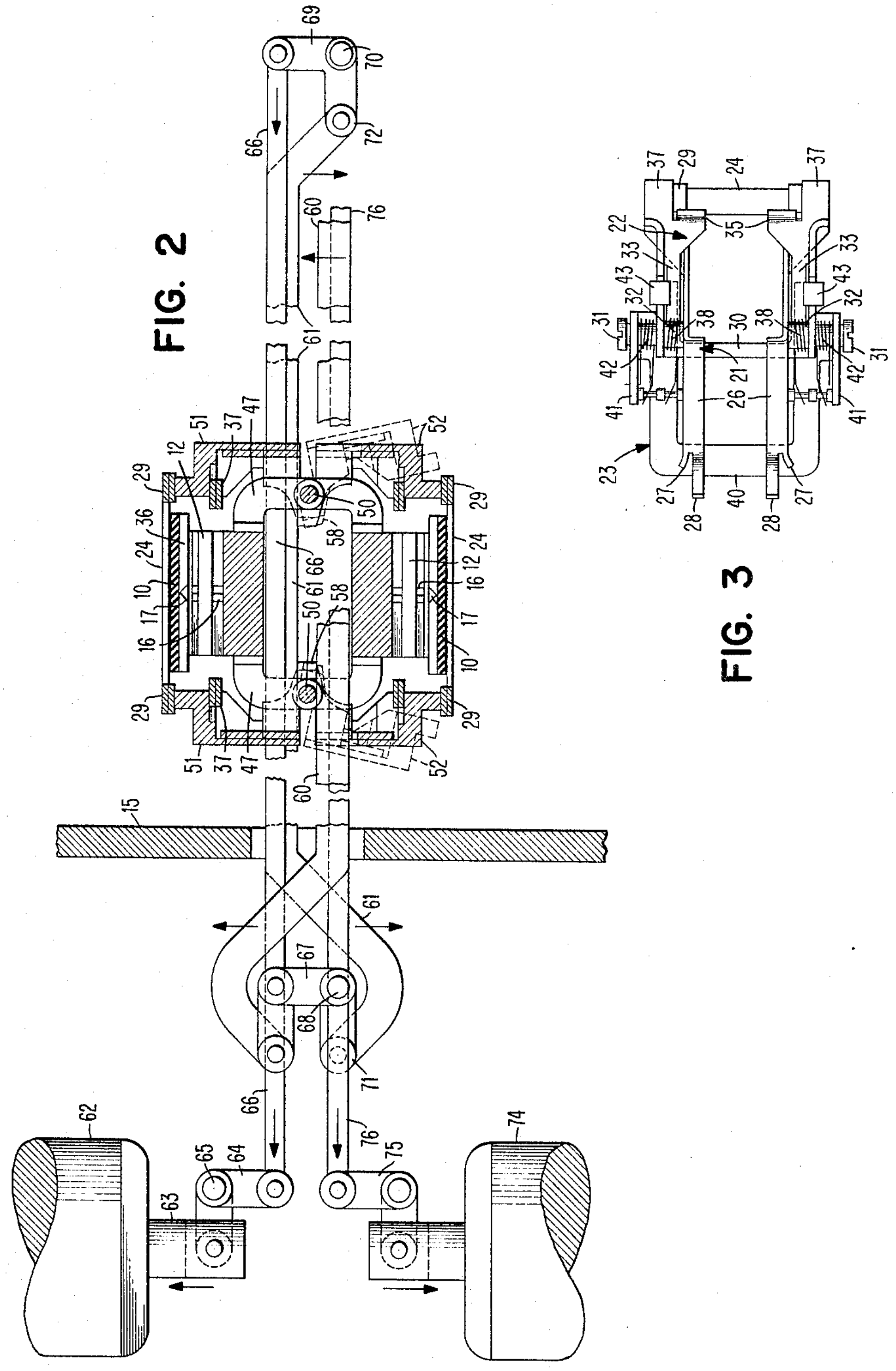
FIGURE 2 is a partial sectional view of a carrier-disengaging station taken along the line 2—2 in FIG. 1 in combination with a front elevation view of the actuating linkage therefor.
FIGURE 3 is a plan view of a carrier clip shown in FIG. 1.

Documents are conveyed from one position to another along the belt path by carrier means comprised of a clip generally designated 20. The clip can be selectively engaged with and disengaged from the belt and is best shown in FIGS. 1 and 3. The clip comprises a body element 21 on which are pivotally mounted belt gripper element 22 and document gripper element 23. Clip body element 21 is essentially a U-shaped member in which the cross portion 24 of the U rides adjacent the outer, smooth surface of the belt and is the front or leading part of the clip during movement. The sides 25 of the body element are similar and each is adjacent an edge of the belt normal to the plane of the belt with a shorter flange portion 26 parallel to the plane of the belt which rides adjacent the inner belt surface. The extreme ends 27, 28 of the sides and flanges, respectively, are curved outwardly from the belt to serve as a guide for the moving belt when the clip is disengaged from the belt. Cross portion 24 of the body element is wider than the belt at the clip front to form cam engaging surfaces 29.

Belt gripper element 22 is also a U-shaped member approximately half the length of element 21 and is pivotally mounted near its cross portion 30 on element 21 by screws 31 which are threadedly secured in shoulders 32 affixed to element 21. The sides 33 thereof extend from the pivot screws toward the front of the body element adjacent the inner toothed surface of the belt. The ends widen into arcuate portions 35 curved to engage one of the belt teeth 18 and into cam engaging portions 37. Torsion springs 38 are mounted on shoulders 32 to constantly urge the arcuate portions 35 into engagement with the belt.

Document gripper 23 is a U-shaped member with the cross portion 40 at the rear of the body clip 21 adjacent the outer surface of the belt. The sides of the document gripper have flanges 41 thereon pivotally mounted on screws 31. Cross portion 40 is constantly urged toward the outer belt surface by a torsion spring 42 mounted on screws 31. The ends of the document gripper each have a tab 43 extending upwardly therefrom and bent inwardly over the sides of belt gripper 22.

With this arrangement the document gripper can be opened in either of two ways. The first is to force the document gripper to pivot on screws 31 by engaging the extensions of flanges 41 with a cam surface such as that provided by cam 44 secured to a bar 45 in FIG. 1. When the carrier clip moves with the belt under the block, the flanges are forced downward and open the document gripper 23. The second method of opening the gripper is by forcing body member 21 and belt gripper 22 apart at the front of the clip. When the belt gripper moves up, it engages tabs 43 which also force document gripper 23 to pivot about screws 31.

The carrier clips are disengaged from the moving belt by cams supported intermediate the belt spans. There are two cam stations, upper and lower, provided to disengage the clips from the belt which are located near the idler pulley 12 where documents are supplied to the stacking apparatus. The cam mechanism is supported by a mounting bar 45 which is, in turn, supported on the two shafts 13, 14. The bar may be secured in any well-known manner to plate 15, if desired. The bar is provided with a cutout 46 adjacent which the upper and lower set of latches or cams are secured. On either side of bar 45 there are attached a pair of arcuate pivot brackets 47 in which a pin 50 is journaled and held in place by clips. The pin serves as the common support and pivot for an upper cam arm 51 and lower cam arm 52. Each arm has a respective pair of perforated tabs 53 bent inwardly toward the support bars through which the pin passes. A torsion spring 55 is supported on each pin between the tabs and the ends of the spring are hooked on the upper and lower cam arms 51, 52 to constantly urge the outer ends of the arms inwardly toward the corresponding upper and lower belt spans. As shown in FIG. 2, there is identical cam arm structure on the opposite side of the bar.

Each arm has a pointed cam 57 formed or secured thereon with the point extending into the direction of movement of the belt. The cam points pass between the cam-engaging tabs of the clip body element and belt gripper elements. The cam surfaces force the elements apart, overcoming the effect of torsion springs on the screws 31 and shoulders 32 of the clip. At the rear of each cam there is provided a stop 59 to prevent the tabs from sliding off the cams because of the clip momentum. As elements 21 and 22 are opened, the gripper element 21 is disengaged from the belt tooth. The carrier clip thus stops and is held at the disengaging station. The upper and lower disengaging stations are identical and the two operate in the same manner. Since element 22 is forced open by the cams, the document gripper element is also forced open because of the tabs 43 engaged with the belt gripper.

The carrier clip is engaged with the belt by pivoting arms 51, 52 with their cams 57 away from the clips. This permits the torsion springs on the pivot screw and shoulder of the clips to close the belt gripper 22 and document gripper 23 on the belt. The cams are disengaged by the linkage and solenoids shown in FIGS. 1 and 2. In FIG. 1, it will be seen that one pivot tab of each arm 51, 52 has an extension 58 thereon which may be engaged by actuating links 60 and 61 to cause the arms to rotate about the pivot pin 50. For example, link 60 is moved up causing arms 51 to move out away from the belt and link 61 is moved down causing arms 52 to move outward away from the carrier and belt, as shown in phantom.

The arms at the lower station are operated independently of those at the upper station by the linkage shown in FIG. 2. When solenoid 62 receives an energizing pulse, its plunger 63 moves upward in the direction of the arrow rocking bellcrank 64 clockwise about pivot 65. Link 66 is moved to the left so that it rocks bellcranks 67 and 69 each connected therewith in a counterclockwise direction about their respective pivots 68 and 70. Link 61 is connected between ends 71, 72 of the bellcranks 68 and 70 and is forced downward against extensions 58 on cam arms 52. This causes the cam ends of the arms to move away from the belt and carrier clip 20 at the lower station. The clip thus engages the belt and clamps any document present therein against the outer belt surface for movement with the belt. The cam arms at the upper station are operated in a similar manner by solenoid 74 which rotates bellcrank 75 counterclockwise to pull link 76 to the left. This link also rotates a pair of bellcranks in the clockwise direction so that link 60 is caused to move up and rotate cam arms 51 away from the clip at the upper station.

The movement of documents from a transport path to the stacker is accomplished by directing the incoming documents into an open clip at the lower station. The lower clip station is located near pulley 11 as shown in FIG. 1 so that the document gripper element 23 is held open adjacent a guide surface to receive a document. Documents are successively propelled along guide plate 80 by feed rolls such as 81 toward stacker pocket 82. There are provided a pair of document edge sensors 83, 84 which may be switches or photo-sensors. Sensor 83, connected to solenoid 62 through a monostable multivibrator (not shown) activates the solenoid upon sensing the leading edge of a document. This allows the carrier clip at the lower station to engage the belt. The sensor is located an appropriate distance from the lower clip station so that the leading document edge is between the document gripper 23 and the belt surface at the time the clip closes. The gripper clamps the document to the belt as the clip moves, thus drawing the document along. The belt speed is maintained at the same peripheral speed of the rolls. As the clip nears the end of stacking pocket 82, cam 44 engages flange 41 forcing only the document gripper open. The document is thus released and deposited in the pocket. A resilient back plate 86 and pad 87 may be provided to prevent damage to the document edge as it is stopped in the pocket. Stacker plate 88 is suitably mounted for movement downward as the document stack increases in size.

Sensor 84, capacitively connected to a monostable multivibrator (not shown) which is, in turn, connected to solenoid 74, is normally closed and activates the multivibrator when the trailing edge of the document is sensed. This energizes the solenoid which releases the second carrier clip at the upper station for travel with the belt. Solenoid 62 for the lower station was de-energized after its multivibrator output signal terminated and its cam arms disengage the second clip from the belt. The second clip is in position to receive a succeeding document. The first clip after delivering a document continues its travel until disengaged from the belt at the upper station.

Although the stacking apparatus has been described with two clip stations, the number of stations can be varied as desired. For example, a single clip station is possible if document frequency is low. Additional clip storage stations can be added if the frequency is high. The storage stations can be located along the upper belt span and actuated simultaneously so that all stored clips move up on station. Another obvious modification is to actuate both the upper and lower stations by a common pulse. This can be done where document lengths are relatively constant. It will be noted that the stacking apparatus may be used in conjunction with more than one stacking pocket. Additional pockets utilize selectively movable cams 44, back plates 86 and pads 87. The elements can be operated electromagnetically to direct a document to the selected pocket.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for conveying a sheet of material comprising:
 an endless member movable about a fixed path;
 carrier means engageable with said member for movement therewith, and being adapted to carry said sheet therein when engaged;
 means adjacent said member operable for selectively engaging said carrier means with said member; and
 control means activated by said sheet for operating said engaging means.

2. Conveying apparatus comprising:
 an endless member moving continuously about a fixed path;
 releasable carrier means biased for engagement with said member for movement therewith;
 disengaging means movable into the path of travel of said carrier means when engaged for overcoming said bias to release said carrier means from said member; and
 means for selectively removing said disengaging means from said path of travel.

3. Conveying apparatus comprising:
 an endless member moving continuously about a fixed path and having projections fixed thereon;
 releasable carrier means biased for engagement with said projections for movement of said member;
 operating means movable into the path of travel of said carrier means for overcoming said bias to disengage said carrier means from said projections; and
 control means selectively activatable for removing said disengaging means from said path of travel.

4. Article conveying apparatus comprising:
 an endless member continuously moving about a fixed path;
 releasable carrier means biased for engagement with said member for movement therewith and having a clamping element thereon biased to grip an article when said carrier means is engaged;
 disengaging means movable into the path of travel of said carrier means, when engaged, for overcoming said bias of said carrier means and said element to disengage said carrier means and release said grip; and
 control means selectively operable for removing said disengaging means from said path of travel.

5. Apparatus as described in claim 4 further comprising auxiliary means in the path of travel of said carrier means when engaged for rendering the bias of said element ineffective and thereby release said article.

6. Document conveying apparatus comprising:
 an endless member movable about a fixed path;
 carrier means releasably biased for engagement with said member for movement therewith and having a movable portion thereon biased to a document gripping position and operable to an open position;
 operating means adjacent said member engageable with said carrier means for releasing said carrier means from said member and opening said portion; and
 means disengaging said operating means from said carrier means whereby said carrier means engages said member and said portion moves to said gripping position.

7. Apparatus for conveying sheets of material from one location to another comprising, in combination:
 an endless member movable along a fixed path between said locations;
 carrier means releasably engageable with said member for movement therewith, and having a movable portion biased to a document-gripping position from an open position;
 means adjacent said member at said one location effective for engaging said carrier means during said movement to release said carrier means from said member that operate said portion to said open position, said release means being adapted to be selectively rendered ineffective;
 control means connected to said release means for rendering the release means ineffective; and
 means along said path for opening said portion at said other location.

8. Apparatus for conveying sheets of material comprising:
 an endless member movable along a fixed path;
 carrier means selectively engageable with said member for movement therewith, and having a portion thereon operable to a sheet-gripping position and to a sheet-receiving position;
 means operable to a first position for holding said carrier means disengaged from said member and said portion in said receiving position, and to a second position for engaging said carrier means with said member and said portion in said gripping position;
 means for transporting a sheet to a position adjacent said portion; and
 means controlled by said sheet in said transport means for operating said holding means to said second position.

9. Apparatus for conveying a sheet of material comprising:
 an endless member moving about a fixed path;
 carrier means engageable with said member for movement therewith and having a clamping member adapted to grip said sheet therein when said carrier means is engaged;
 means adjacent said member operable for selectively engaging said carrier means with said member;
 means for moving said sheet toward said clamp; and
 control means activated by said sheet in the proximity of said clamp for operating said engaging means.

10. Apparatus for conveying a sheet comprising:
 an endless member movable along a fixed path;
 carrier means for said sheet operable for engagement with and disengagement from said member, said carrier means being adapted to move said sheet therewith when engaged and receive a sheet therein when disengaged;
 means adjacent said member for disengaging said carrier means and operable to selectively engage said carrier means with said member; and
 means activated by the presence of said sheet for controlling said operating means.

11. Apparatus for conveying a sheet to a stacker, comprising:
 an endless, flexible member continuously moving about a fixed path;
 sheet carrier means biased for engagement with said member for movement therewith and disengageable therefrom, said carrier means having thereon a clamp biased to move and grip said sheet from an open position when said carrier means is engaged;
 disengaging means at one position in the path of travel of said carrier means and effective to overcome the bias of said carrier means and said clamp to disengage said carrier means and move said clamp to said open position;
 means connected to said disengaging means and operable for displacing said disengaging means from said path of travel to engage said carrier means with said member and grip said sheet; and
 opening means at a second position of said path of travel operable to overcome said clamp bias and release a sheet gripped therein.

12. In apparatus for transporting a sheet of material, the combination comprising:
- an endless member moving continuously about a fixed path;
- carrier means biased for engagement with said member for movement therewith and having a clamping element thereon biased to grip said sheet when said carrier means is engaged;
- disengaging means movable into the path of travel of said carrier means when engaged for overcoming said bias of said carrier means and said element to disengage said carrier means and release said grip;
- means operable to displace said engaging means from said path of travel;
- means for feeding said sheet toward said carrier means when disengaged; and
- control means activated by the approach of said sheet for operating said displacing means.

13. In apparatus for transporting sheets of material, the combination comprising:
- an endless member moving continuously about a fixed path;
- first and second carrier means, each biased for engagement with said member for movement therewith and having an element thereon biased to grip a sheet when said carrier means is engaged;
- removable first and second disengaging means in the path of travel of said carrier means when engaged for overcoming the bias of said carrier means and said element to disengage said carrier means from said member and release said grip;
- first and second displacing means corresponding to said first and second disengaging means, each being operable to remove its disengaging means from said path of travel;
- feeding means for moving a sheet toward said first carrier means when disengaged; and
- control means actuated by a said leading edge of said moving sheet for operating said first displacing means and activated by the trailing edge of said sheet for operating said second displacing means.

14. Apparatus as described in claim 13 further including auxiliary means in the path of travel of said carrier means when engaged for rendering the bias of said element ineffective to thereby release said sheet.

15. In apparatus for transporting sheets, the combination comprising:
- an endless, toothed member moving continuously about a fixed path;
- sheet carrier means with first spring means thereon for urging said carrier means into engagement with a said tooth for movement therewith, and having an element with second spring means therefor urging said element into a sheet gripping position from an open position;
- movable disengaging cams in the path of travel of said carrier means for engaging said carrier means to overcome the effect of both said spring means and disengage said carrier means from said tooth and move said element to said open position;
- a displacing linkage for said cam operable to displace said cam from said path of travel; and
- electrical means actuated by said sheets for operating said linkage.

References Cited by the Examiner

UNITED STATES PATENTS

| | | | | |
|---|---|---|---|---|
| 705,887 | 7/1902 | Whitehouse | 198—180 | X |
| 2,097,772 | 11/1937 | Novick | 271—79 | X |
| 3,204,756 | 9/1965 | Lesch | 198—19 | X |

References Cited by the Applicant

UNITED STATES PATENTS

| | | |
|---|---|---|
| 2,761,679 | 9/1956 | Tebbs. |
| 2,795,861 | 6/1957 | Black. |
| 3,092,237 | 6/1963 | Miller. |

M. HENSON WOOD, Jr., *Primary Examiner.*

J. N. ERLICH, *Assistant Examiner.*